(12) United States Patent
White

(10) Patent No.: US 10,347,106 B2
(45) Date of Patent: Jul. 9, 2019

(54) VIRTUAL BARRIER SYSTEM AND METHOD

(71) Applicant: LONE WORKER SOLUTIONS LTD., Bury (GB)

(72) Inventor: Stephen White, Bury (GB)

(73) Assignee: LONE WORKER SOLUTIONS LTD, Bury (GB)

( * ) Notice: Subject to any disclaimer, the term of this patent is extended or adjusted under 35 U.S.C. 154(b) by 0 days.

(21) Appl. No.: 15/553,377

(22) PCT Filed: Feb. 25, 2016

(86) PCT No.: PCT/GB2016/050476
§ 371 (c)(1),
(2) Date: Aug. 24, 2017

(87) PCT Pub. No.: WO2016/135488
PCT Pub. Date: Sep. 1, 2016

(65) Prior Publication Data
US 2018/0137730 A1    May 17, 2018

(30) Foreign Application Priority Data

Feb. 25, 2015 (GB) .................................. 1503144.6

(51) Int. Cl.
| | |
|---|---|
| *H04W 12/08* | (2009.01) |
| *G08B 21/02* | (2006.01) |
| *H04W 4/021* | (2018.01) |
| *B61L 23/06* | (2006.01) |
| *B61L 25/02* | (2006.01) |

(Continued)

(52) U.S. Cl.
CPC .............. *G08B 21/02* (2013.01); *B61L 23/06* (2013.01); *B61L 25/025* (2013.01); *G01S 1/68* (2013.01); *H04L 67/306* (2013.01); *H04W 4/021* (2013.01); *H04W 4/80* (2018.02);
(Continued)

(58) Field of Classification Search
None
See application file for complete search history.

(56) References Cited

U.S. PATENT DOCUMENTS 6,369,710 B1 * 4/2002 Poticny et al. ............ 340/572.1
2003/0193388 A1   10/2003 Ghabra
(Continued)

*Primary Examiner* — Brent Swarthout
(74) *Attorney, Agent, or Firm* — McInnes & McLane LLP; Seth A. Milman

(57) ABSTRACT

A virtual barrier system for determining a position of a mobile device relative to a virtual barrier comprises: a plurality of transmitters configured to broadcast a unique identifier; a management platform for storing positional data for each transmitter; a mobile application for installation on a mobile device. The management platform is configured to communicate with the mobile application. The plurality of transmitters are arranged in pairs, one of each corresponding with a first or second zone. The pairs are positioned to define the virtual barrier between said first and second zones. The management platform is configured to: (a) map the barrier; (b) receive transmitted data from the mobile application when the mobile application detects the unique identifier, and (c) send an alert to the mobile application for display. The first zone and second zone comprise different statuses, and the status of the second zone is dependent upon a specific user.

19 Claims, 2 Drawing Sheets

(51) Int. Cl.
*G01S 1/68* (2006.01)
*H04W 4/80* (2018.01)
*H04L 29/08* (2006.01)
*H04M 1/725* (2006.01)

(52) U.S. Cl.
CPC ..... *G08B 21/0261* (2013.01); *H04M 1/72525* (2013.01); *H04M 1/72572* (2013.01)

(56) References Cited

U.S. PATENT DOCUMENTS

| | | | |
|---|---|---|---|
| 2005/0092831 A1* | 5/2005 | Sandoval | G07B 15/04 235/382 |
| 2011/0146590 A1* | 6/2011 | Giunta | A01K 15/023 119/721 |
| 2014/0111380 A1 | 4/2014 | Gibbs | |
| 2014/0331272 A1 | 11/2014 | Gupta | |
| 2015/0233758 A1* | 8/2015 | Chiu | G01J 1/0403 250/347 |
| 2016/0073264 A1* | 3/2016 | Van den Broeck | H04W 4/021 455/411 |

\* cited by examiner

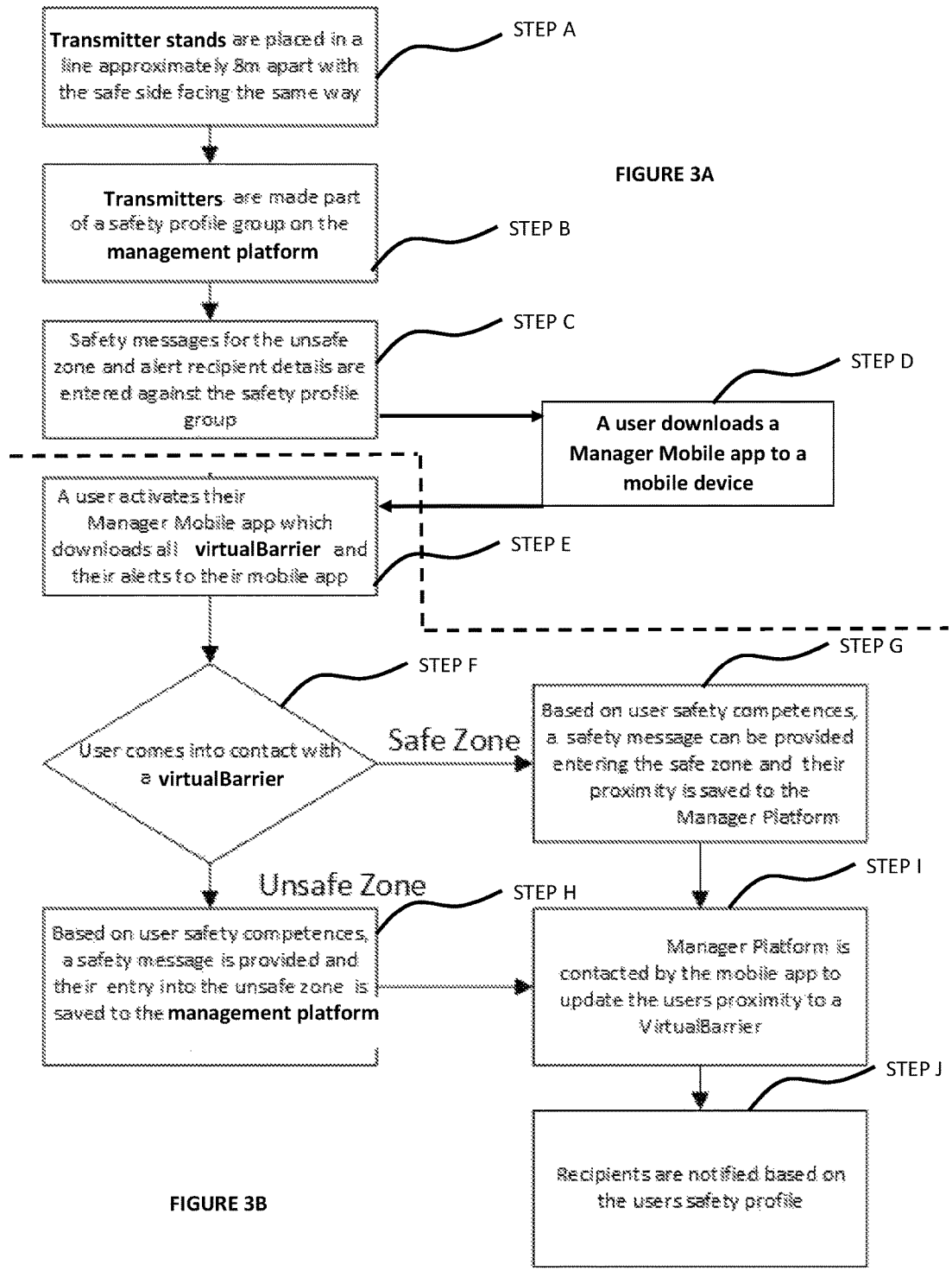

VIRTUAL BARRIER SYSTEM AND METHOD

BACKGROUND

Technical Field

The present invention relates generally to the field of security and health and safety systems. More particularly, but not exclusively, the present invention concerns a virtual barrier system for use in a security and/or health and safety context.

SUMMARY OF THE INVENTION

In a first aspect of the present invention there is provided a virtual barrier system for determining a position of a mobile device relative to a virtual barrier, comprising: a plurality of transmitters each configured to broadcast a unique identifier; a management platform for storing positional data for each transmitter; and a mobile application for installation on a mobile device, the management platform being configured to communicate with the mobile application, characterised in that the plurality of transmitters are arranged in pairs, one of each pair corresponding with a first zone and the other corresponding with a second zone, the pairs being positioned so as to define the virtual barrier between said first zone and said second zone, and the management platform is configured to: (a) map the barrier defined by said pairs of transmitters dependent upon the positional data stored; (b) receive transmitted data from the mobile application when the mobile application detects the unique identifier of one or more of the transmitters and thereby determine a proximate location of the mobile device relative to the barrier; and (c) send an alert to the mobile application for display on said mobile device depending upon said proximate location, characterised in that the first zone and the second zone comprise different statuses, e.g. different authorisation or safety statuses, and the status of the second zone is dependent upon a specific user.

With this system, a user of a mobile phone can be informed of their approach/crossing of a virtual barrier from a first zone to a second zone and vice versa, without the system having to rely on GPS data. The system is efficient and inexpensive to employ since the transmitters do not need to employ two-way communication, since they simply broadcast a universally unique identifier (UUI), which is picked up by a mobile device running the appropriate mobile application: the positional data is stored and mapped by a remote server and the system only requires internet connectivity for a mobile device hosting the application and the management platform.

Preferably, the virtual barrier comprises a wireless barrier.

Preferably, each of the pairs of transmitters are mounted on a transmitter stand. Preferably, the transmitter stand comprises one of the pair of the transmitters on opposing sides thereof.

Preferably, the transmitter stand comprises a first side comprising a respective first transmitter and a second side comprising a respective second transmitter.

Preferably, the first zone (first side and first transmitter) corresponds with a safe status and the second zone (second side and second transmitter) corresponds with an unsafe status.

Additionally, or alternatively, the first zone (first side and first transmitter) corresponds with an authorised status and the second zone (second side and second transmitter) corresponds with an unauthorised status.

Each transmitter stand preferably comprises a mounting member for the pair of transmitters. The mounting member preferably comprises a plate member. Preferably, the plate member comprises shields for the transmitters. The shields may comprise a hinged lid or a snap-fit lid.

Preferably, the transmitters are removably mounted to the mounting member in any suitable manner.

Preferably, the first side of the mounting member presents information regarding the second zone, e.g. 'CAUTION: approaching an unsafe area'. Preferably, the second side of the mounting member presents information regarding the first zone, e.g. 'Approaching a safe area'.

The mounting member is preferably mounted at a distance from the ground. Preferably, therefore, the mounting member is supported by a post.

The transmitter stand may be permanent or temporary.

The transmitter stand preferably comprises a floor-standing base to support said post. The floor-standing member may comprise a tripod.

Alternatively, the transmitter stand preferably comprises a submerging base for submerging below a ground surface to support said post. The submerging base may comprise a block.

Preferably, the transmitters comprise wireless technology configured to exchange data over short distances. More preferably, the transmitters comprise Bluetooth® technology. Most preferably, the transmitters comprise Bluetooth® Low Energy (BLE) technology.

The transmitters may comprise iBeacon® technology provided by Apple, Inc.

Preferably, the unique identifiers comprise universally unique identifiers, e.g. an identifier that is unique amongst all transmitters used worldwide.

Preferably, the positional data comprises a position within the barrier, e.g. relative to the other pairs of transmitters in the barrier. Preferably, therefore, the positional data comprises a sequentially appointed number for each pair of transmitters within the barrier.

Preferably, each transmitter in a pair is provided with a zone reference, e.g. unsafe zone or safe zone.

Preferably, the barrier comprises a barrier profile stored on the management platform. Preferably, the barrier profile comprises the UUI and the positional data for each transmitter in each pair. Preferably, the management platform comprises at least one barrier profile.

Preferably, each barrier profile comprises a barrier identifier, e.g. information regarding the geographical location of the barrier.

Preferably, each barrier profile comprises zone information, e.g. information regarding the nature of the each zone separated by the barrier.

Preferably, each barrier profile comprises an entity name, e.g. 'Electrified train tracks'.

Preferably, each barrier profile comprises: one or more alert messages and/or one or more alert procedures and/or one or more alert conditions.

Preferably, the management platform comprises a barrier module comprising one or more of said barrier profiles.

Preferably, the proximate location of the mobile device is determined using said transmitted data.

Preferably, the transmitted data comprises at least the UUI of at least one pair of transmitters. Preferably, the transmitted data comprises an approximate distance of the mobile device from each transmitter in the at least one pair. Preferably, the transmitted data comprises a unique user personal identifier.

Preferably, the management platform comprises individual user profiles for each user. Preferably, each user profile comprises the user personal identifier. Preferably, each user profile comprises personal data regarding the respective user. Preferably, each user profile comprises user permissions for the respective user. Preferably, each user profile comprises a user location history for the respective user. Preferably, the user permissions for a user are set for each barrier profile.

Preferably, the management platform comprises a user module comprising one or more of said user profiles. Preferably, the user module is configured to receive proximity location data from the barrier profile module and store it in the location history for the user.

Preferably, the user personal identifier is stored by the mobile application on a user's mobile device.

Preferably, the management platform is configured to receive transmitted data and transmit alerts over the internet to and from the mobile application.

Preferably, each barrier profile comprises at least one 'approach' alert message. Preferably, the approach alert message conveys a message notifying of the presence of a barrier in the vicinity. Preferably, the 'approach alert' is sent when the transmitted data shows that the mobile device is closer to the first transmitter than the second transmitter in a respective pair.

Preferably, each barrier profile comprises at least one 'warning' alert message. Preferably, the warning alert message conveys a message notifying that a user has passed beyond a boundary of the barrier. Additionally, or alternatively, the warning alert message provides information about a user's security clearance status. Additionally, or alternatively, the warning alert message provides information about special conditions that must be observed within a respective barrier (e.g. safety clothing). Preferably, the 'warning alert' is sent when the transmitted data shows that the mobile device is closer to the second transmitter than the first transmitter in a respective pair.

Preferably, each barrier profile comprises at least one alert procedure. Preferably, the alert procedure raises an alarm to trigger a particular escalation procedure for the respective user, e.g. notifying third parties of a particular user passing within a barrier. The alert procedure may sound an audible alarm within the vicinity of the unsafe zone. Preferably, the alert procedure is triggered when the transmitted data shows that the mobile device is closer to the second transmitter than the first transmitter in a respective pair.

Preferably, each barrier profile comprises at least one alert condition. Each alert condition may be fulfilled when a proximity location of a mobile device is determined as being within a particular distance range of the barrier. There may be a plurality of ranges. The ranges may include an immediate range and/or a near range and/or a far range.

The immediate range may comprise a distance of up to approximately 1 meter of transmitter, more preferably, up to approximately 0.5 meter of a transmitter, most preferably, up to a few centimeters of a transmitter.

The near range may comprise a distance of up to approximately 3 meters of transmitter, more preferably, up to approximately 2 meters of a transmitter, most preferably, up to 1 meter of a transmitter.

The far range may comprise a distance of up to approximately 50 meters of transmitter, more preferably, up to approximately 25 meters of a transmitter, most preferably, up to 10 meters of a transmitter.

Preferably, the barrier module is configured to receive the transmitted data from the mobile application.

Preferably, the barrier module is configured to identify respective barrier profile by cross-referencing the received UUIs with the stored UUIs of each barrier profile.

Preferably, the barrier module is configured to identify a respective user and store the proximity location within the user's profile in said user module.

Preferably, the barrier module is configured to select an appropriate alert to said mobile application by cross-referencing the alerts in the barrier profile with the user's permissions in the user profile. Preferably, the selection of the alert also cross-references the approximate distance of the mobile device from at least one transmitter in a pair.

Preferably, the mobile application comprises a wireless detection protocol to identify broadcasted UUIs for transmitters. Preferably, the mobile application is configured to approximately find its relative location to at least one transmitter.

Preferably, the mobile application comprises a wireless data transmission protocol to transmit data across the internet.

Preferably, the mobile application comprises a data receiving protocol to receive alerts.

Preferably, the mobile application comprises a mobile user interface to display/execute received data.

Preferably, the mobile application is configured to store a user's personal identifier.

Preferably, the mobile application is configured to store one or more barrier profiles.

In a second aspect of the present invention there is provided a method for establishing a virtual barrier for determining a position of a mobile device relative to a specific zone, comprising: deploying a plurality of transmitters each configured to broadcast a unique identifier; configuring a management platform to store positional data for each transmitter; and installing a mobile application on a mobile device, configuring the management platform to communicate with the mobile application, the method comprising deploying the plurality of transmitters in pairs so as to define the virtual barrier between a first zone and a second zone, one of each pair being disposed within the first zone and the other being disposed within the second zone, and further configuring the management platform to: (a) map the barrier defined by said pairs of transmitters dependent upon the positional data stored; (b) receive transmitted data from the mobile application when the mobile application detects the unique identifier of one or more of the transmitters and thereby determine a proximate location of the mobile device relative to the barrier; and (c) send an alert to the mobile application for display on said mobile device depending upon said proximate location, characterised in that the first zone and the second zone comprise different statuses, e.g. different authorisation or safety statuses, and the status of the second zone is dependent upon a specific user.

It will be appreciated that the preferred features described in relation to the first aspect of the invention apply to the second aspect of the invention.

In a third aspect of the invention there is provided a transmitter stand comprising a pair of transmitters mounted on opposing sides thereof.

It will be appreciated that the preferred features described in relation to the first aspect of the invention apply to the third aspect of the invention.

BRIEF DESCRIPTION OF THE DRAWINGS

For a better understanding of the invention, and to show how exemplary embodiments may be carried into effect, reference will now be made to the accompanying drawings in which:

FIG. 3A is a flowchart demonstrating the method of set-up of the invention; and

FIG. 3B is a flowchart demonstrating the method of use of the invention.

DETAILED DESCRIPTION OF THE EXEMPLARY EMBODIMENTS

Figure 1:
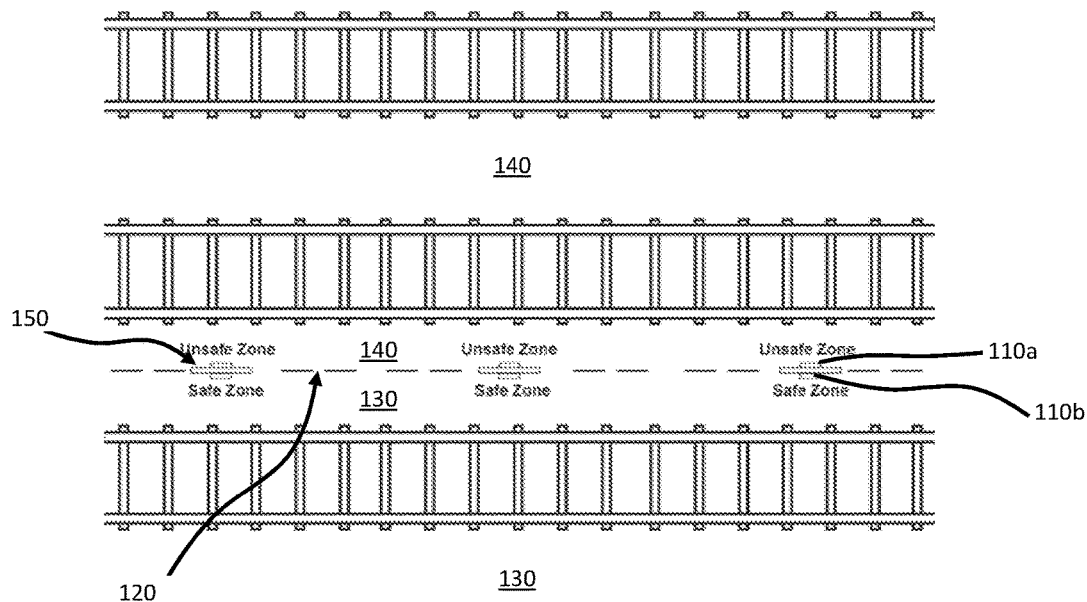
FIG. 1 shows an application of a virtual barrier system according to one embodiment of the invention.

The FIGS. 1-3 show a virtual barrier system 100, 200 according to an exemplary embodiment of the invention.

As shown in the Figures, a virtual barrier system 100 for determining a position of a mobile device relative to a virtual barrier, comprises: a plurality of transmitters 110a, 110b each configured to broadcast a unique identifier; a management platform (not shown) for storing positional data for each transmitter 110a, 110b; and a mobile application (not shown) for installation on a mobile device (not shown), the management platform being configured to communicate with the mobile application, the plurality of transmitters 110a, 110b being arranged in pairs 110a, 110b, one of each pair corresponding with a first zone 130 and the other corresponding with a second zone 140, the pairs 110a, 110b, being positioned so as to define the virtual barrier 120 between said first zone 130 and said second zone 140, and the management platform is configured to: (a) map the barrier 120 defined by said pairs of transmitters 110a, 110b dependent upon the positional data stored; (b) receive transmitted data from the mobile application when the mobile application detects the unique identifier of one or more of the transmitters 110a, 110b and thereby determine a proximate location of the mobile device relative to the barrier 120; and (c) send an alert to the mobile application for display on said mobile device depending upon said proximate location, characterised in that the first zone 130 and the second zone 140 comprise different statuses, e.g. different authorisation or safety statuses, and the status of the second zone 140 is dependent upon a specific user.

Figures 2A, 2B:
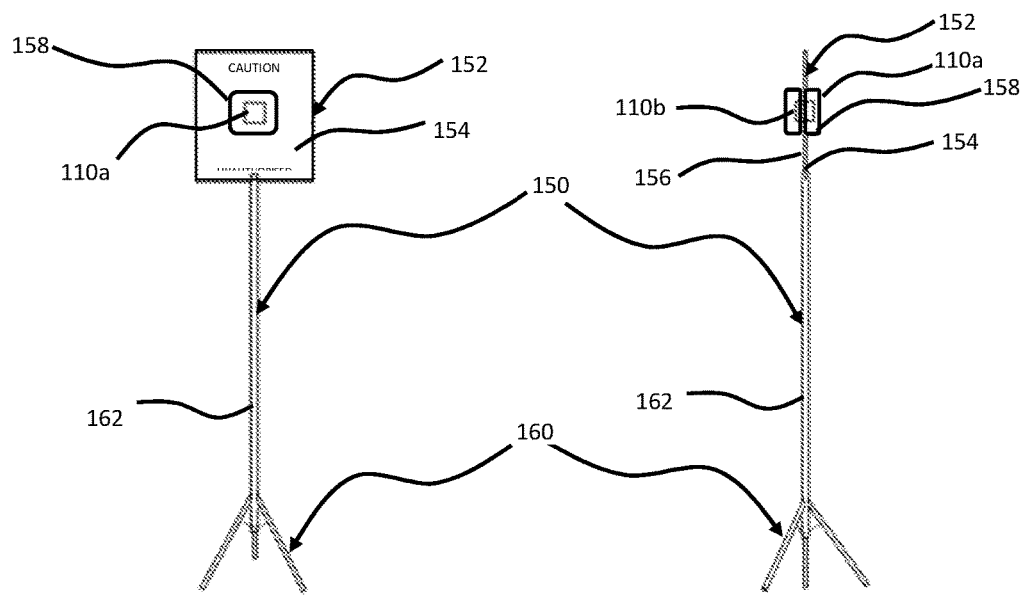
FIG. 2a shows a front view of transmitter stand for use within the virtual barrier system according to FIG. 1.
FIG. 2b shows a side view of a transmitter stand for use within the virtual barrier system according to FIG. 1.

As shown in FIGS. 2a and 2b, each of the pairs of transmitters 110a, 110b are mounted on opposing sides of a mounting plate 152 of a transmitter stand 150.

The mounting plate 152 comprises a designated first side 154 comprising a respective first transmitter 110a and a second side 156 comprising a respective second transmitter 110b. The transmitters 110a, 110b are removably mounted to the mounting plate 152 in any suitable manner, such as an adhesive or screw-fittings. Each mounting plate 152 comprises shields 158 for the disposal over the transmitters 110a, 110b. The shields 158 are movable or removable to allow access to the transmitters 110a, 110b thereunder, by being configured as either a hinged lid or a snap-fit lid. The first side 154 of the mounting plate 152 presents information regarding the second zone 140, e.g. 'CAUTION: approaching an unsafe area'. Preferably, the second side 156 of the mounting plate 152 presents information regarding the first zone 130, e.g. 'Approaching a safe area'.

The transmitter stand may be permanent or mobile. A mobile embodiment is shown in FIGS. 2a and 2b with a floor-standing tripod base 160 and an upstanding post 162. However, it is to be appreciated that an alternative form of base may be employed to make the stand 150 more permanent.

The transmitters 110a, 110b employ wireless technology configured to exchange data over short distances. In preferred embodiments, the transmitters 110a, 110b employ Bluetooth® and in exemplary embodiments, the transmitters 110a, 110b employ Bluetooth® Low Energy (BLE) technology. Suitably configured transmitters 110a, 110b include the iBeacon® that is provided by Apple, Inc.

The management platform is configured to transmit and receive data over the internet to the mobile application.

The management platform comprises a barrier module adapted to create and store barrier profiles for a specific barrier 120.

Each barrier profile comprises: (1) a barrier identifier; (2) data about the barrier geographical location; (3) data about the statuses of the first and second zones 130, 140 (4) transmitter pair data for each pair of transmitters 110a, 110b associated with the barrier 120, including transmitter pair identifiers, and the pair position relative to the other pairs; (5) specific transmitter data, including respective UUIs and assignation to the first or second zone 130, 140; and (4) one or more alert messages and/or alert procedures and/or alert conditions.

There may be more than one alert message, alert procedure or alert condition for each profile depending upon the purpose of the barrier 120.

For example, an 'approach' alert message conveys a message notifying of the presence of a barrier 120 in the vicinity, whereas a 'warning' alert message conveys a message notifying that a user has passed beyond the boundary of the barrier 120 and/or provides information about a user's security clearance status, and/or provides information about special conditions that must be observed within that barrier 120 (e.g. safety clothing).

An alert procedure may raise an alarm to trigger a particular escalation procedure for a particular user, for example, notifying third parties of a particular user passing within a barrier, or sounding an audible alarm within the vicinity of the second zone 140.

Accordingly, alert conditions, may include a proximity location being within a particular distance range of the barrier 120. In this respect, the user can be informed of the correct safety procedure or warned that they do not have the authorisation to enter that area. If an unauthorised user enters the barrier 120 the warning alert may receive an audible warning or alarm through the mobile device and/or the system may raise an alarm to trigger a particular escalation procedure for the particular user.

The barrier module is configured to: (1) receive transmitted data from the mobile application regarding the user's personal identifier, transmitter UUIs and distance of the mobile from the transmitter 110a, 110b; (2) cross-reference the UUI's with the UUIs stored within each barrier profile and identify an respective barrier profile; (3) access the user profile associated with the user's personal identifier and store the proximity location within the user's profile; (4) cross-reference the user's permissions for the respective barrier profile; (5) select an alert from the stored alerts depending upon the user's permissions for the barrier and the distance of the mobile from the detected transmitters 110a, 110b; and (6) transmit the alert to the mobile application of the user's mobile device.

In order to assist the selection of an appropriate alert, the distance of the mobile from the detected transmitters 110a, 110b is categorised into one of three predetermined ranges:

Immediate, e.g. within a few centimeters of the transmitters 110a, 110b which may indicate an imminent likely breach of the barrier 120;

Near: e.g. within a couple of meters of the transmitters 110*a*, 110*b* which may indicate an approach to the barrier 120;

Far: e.g. greater than 10 meters away, which may indicate a barrier 120 in the vicinity.

However, the ranges are configured for the individual barrier 120.

The management platform also comprises a user module adapted to create and store individual user profiles.

Each user profile comprises a personal identifier, personal data regarding the user, user permissions and a user location history. The user permissions are set for each barrier profile.

The user module is configured to receive proximity location data from the barrier profile module and store it in a location history for the user.

The mobile application comprises: (1) detection protocol to identify broadcasted UUIs for transmitters 110; (2) a data transmission protocol; (3) a data receiving protocol; (4) a mobile user interface to display/execute received data; and (5) one or more barrier profiles (as discussed above). This allows the mobile application to function even in a situation where the mobile device has no signal/internet connection with the management platform.

The mobile application is configured to: (1) store a user's personal identifier; (2) sweep for and identify broadcasted UUIs for transmitters 110; (3) transmit the transmitter UUIs and distance therefrom to the barrier module of the server; and (4) receive and display/execute alerts received from the barrier module.

Any smart mobile device with compatible Bluetooth® technology and internet connectivity can be used with the system 100, although a smart phone with Bluetooth® LE technology is preferred.

The method of set-up of the system 100 is shown in FIG. 3A with regard to a safety embodiment. Transmitters 110*a*, 110*b* are located between a first (safe) zone 130 and a second (unsafe) zone 140 by employing the transmitter stands 150 (STEP A). On the management platform, for each barrier 120, identification data and respective UUIs of each of the transmitters 110*a*, 110*b* and a transmitter status (zone assignation) is stored as part of a particular profile, for example 'Electrified train tracks' 100 (STEP B). Other information regarding the geographical location of the barrier and the relative location of a pair relative to other pairs may also be stored. As part of each profile, the system is configured with one or more specific alert messages and/or alert procedures that are triggered when certain conditions are met (STEP C).

An individual user profile is also recorded on the management platform with a personal identifier and particular permissions set against the user relating to one or more barrier profiles. For example, an 'authorised' user's profile (e.g. allowed within a barrier 120), may be configured to trigger a first warning alert message on an approach, but not an alert procedure on passing into the barrier 120, compared with an 'unauthorised' user's profile (e.g. not allowed within a barrier 120), which may be configured to trigger warning alert messages and an alert procedure.

Each user will require the installation of the mobile application to their respective mobile device configured to transmit the user's personal identifier (STEP D). The installation comprises the download of data relating to one or more barrier profiles. This allows the mobile application to function even in a situation where the mobile device has no signal/internet connection with the management platform.

The method of use is shown in FIG. 3B. In use, when activated, the transmitters 110*a*, 110*b* broadcast a UUI outwardly of their location within a predetermined range of say 10 meters. A user activates the mobile application on their mobile device (STEP E).

As a user approaches a wireless barrier 120 (STEP F), the mobile application on their mobile device picks up the UUIs of one or more of the transmitters 110*a*, 110*b* of a pair. The mobile application transmits data to the management platform with a user's personal identifier, the UUIs of the identified transmitters 110*a*/110*b* and in some instances, an approximate distance of the mobile device from the transmitters 110*a*, 110*b*.

Upon the data reaching the management platform, the server looks up the UUIs to determine the relevant wireless barrier 120 profile. Based upon range data transmitted by the application, the server is also able to determine the proximate location of the mobile device to the barrier 120 and the zone 130, 140. The server cross-references the wireless profile with the user's profile. The server saves the proximate location of the user against the user profile and depending upon the permissions for the user, the system may, or may not transmit an alert to the mobile device (STEPS G and H).

In this respect, the user can be informed of the presence of a hazardous zone, the correct safety procedure (e.g. safety clothing) for a zone, or warned that they do not have the authorisation to enter that zone.

The mobile application will continue to transmit updated proximity location data for a user to the management platform for recording in the user's profile (STEPS I and J).

This system 100 provides an efficient and inexpensive method of policing a dangerous zone using transmitters 110*a*, 110*b* broadcasting a universally unique identifier (UUI). The system 100 takes advantage of the multi-functionality of today's mobile devices that are often provided/carried by to users for other communications means. The system only requires internet connectivity for the mobile device (which is standard) and the management platform. Furthermore, since the system 100 depends upon a proximate mobile device for detection of the transmitter 110*a*, 110*b* broadcast, the transmitters 110*a*, 110*b* can be located between an unsafe zone and a safe zone, such as an electrified/non-electrified train track (FIGS. 2*a* and 2*b*).

Although a few preferred embodiments have been shown and described, it will be appreciated by those skilled in the art that various changes and modifications might be made without departing from the scope of the invention, as defined in the appended claims.

The invention claimed is:

1. A virtual barrier system for determining a position of a mobile device relative to a virtual barrier, comprising:
   - a plurality of transmitters each configured to broadcast a unique identifier;
   - a management platform for storing positional data for each transmitter; and
   - a mobile application for installation on a mobile device, the management platform being configured to communicate with the mobile application, wherein the plurality of transmitters are arranged in pairs, one of each pair corresponding with a first zone and the other corresponding with a second zone, the pairs being positioned so as to define the virtual barrier between said first zone and said second zone, and the management platform is configured to:
     (a) map the barrier defined by said pairs of transmitters dependent upon the positional data stored;
     (b) receive transmitted data from the mobile application when the mobile application detects the unique identifier of one or more of the transmitters and thereby determine a proximate location of the mobile device relative to the barrier; and (c) send an alert to the mobile application for display on said mobile device depending upon said proximate location, wherein the first zone and the second zone comprise different statuses, and the status of the second zone is dependent upon a specific user; and wherein each of the pairs of transmitters are mounted on a transmitter stand, a first side comprising a first transmitter presenting information about the second zone and a second side comprising a second transmitter presenting information about the first zone.

2. The system according to claim 1, wherein the virtual barrier comprises a wireless barrier.

3. The system according to any one of claim 1, wherein the first zone (first side and first transmitter) corresponds with a safe status and the second zone (second side and second transmitter) corresponds with an unsafe status.

4. The system according to any one of claim 1, wherein the first zone (first side and first transmitter) corresponds with an authorised status and the second zone (second side and second transmitter) corresponds with an unauthorised status.

5. The system according to any one of claim 2, wherein the transmitters comprise wireless technology configured to exchange data over short distances.

6. The system according to claim 5, wherein the transmitters comprise Bluetooth® Low Energy (BLE) technology.

7. The system according to any one of claim 1, wherein the unique identifiers comprise universally unique identifiers (UUI).

8. The system according to any one of claim 1, wherein the positional data comprises a position within the barrier.

9. The system according to claim 8, wherein the barrier comprises a barrier profile stored on the management platform, comprising the UUI and the positional data for each transmitter in each pair.

10. The system according to claim 9, wherein each barrier profile comprises a barrier identifier, e.g. information regarding the geographical location of the barrier, and zone information.

11. The system according to claim 9, wherein each barrier profile comprises: one or more alert messages and/or one or more alert procedures and/or one or more alert conditions.

12. The system according to claim 9, wherein the management platform comprises a barrier module comprising one or more of said barrier profiles.

13. The system according to claim 12, wherein the proximate location of the mobile device is determined using said transmitted data.

14. The system according to claim 13, wherein the transmitted data comprises at least the UUI of at least one pair of transmitters and a unique user personal identifier.

15. The system according to claim 14, wherein the management platform comprises individual user profiles for each user comprising the user personal identifier and user permissions for the respective user.

16. The system according to claim 1, wherein the management platform is configured to receive transmitted data and transmit alerts over the internet to and from the mobile application.

17. The system according to claim 9, wherein the barrier module is configured to receive the transmitted data from the mobile application and identify the respective barrier profile by cross-referencing the received UUIs with the stored UUIs of each barrier profile.

18. The system according to claim 17, wherein the barrier module is configured to identify a respective user and store the proximity location within the user's profile.

19. The system according to claim 18, wherein the barrier module is configured to select an appropriate alert to said mobile application by cross-referencing the alerts in the barrier profile with the user's permissions in the user profile.

* * * * *